United States Patent
Swaringen et al.

(10) Patent No.: US 8,515,701 B2
(45) Date of Patent: Aug. 20, 2013

(54) METHOD FOR DETECTING PARTICULATE CONTAMINATION UNDER A WORKPIECE

(75) Inventors: Stephen Neal Swaringen, Rockwall, TX (US); Kelly Bruland, Portland, OR (US); Andrew Wells, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 13 days.

(21) Appl. No.: 12/052,475

(22) Filed: Mar. 20, 2008

(65) Prior Publication Data
US 2008/0221817 A1 Sep. 11, 2008

Related U.S. Application Data (62) Division of application No. 11/059,025, filed on Feb. 15, 2005, now Pat. No. 7,363,180.

(51) Int. Cl.
*G01D 18/00* (2006.01)
(52) U.S. Cl.
USPC ............................................................ 702/85
(58) Field of Classification Search
USPC ............................................................ 702/85
See application file for complete search history.

(56) References Cited

U.S. PATENT DOCUMENTS

| | | | |
|---|---|---|---|
| 4,941,082 A | 7/1990 | Pailthorp et al. | |
| 6,172,325 B1 | 1/2001 | Baird et al. | |
| 6,483,071 B1 | 11/2002 | Hunter et al. | |
| 7,015,418 B2 | 3/2006 | Cahill et al. | |
| 2002/0186368 A1* | 12/2002 | Rosengaus et al. | 356/237.2 |

OTHER PUBLICATIONS

Dolores Romero, J. Manuel Fernandez Romero and J. Javier Laserna, Distribution of metal impurities in silicon wafers using imaging-mode multi-elemental laser-induced breakdown spectrometry, Department of Analytical Chemistry, Faculty of Sciences, University of Malaga, E-29071 Ma'laga, Spain J. Anal. At. Spectrom., 1999, 14, 199-204.*
N.G. Shankar and Z.W. Zhong, Defect detection on semiconductor wafer surfaces, Microelectronic Engineering, Available online Dec. 25, 2004, p. 337-346.*
Wei-Yang Chou, Optimization of Back Side Cleaning Process to Eliminate Copper Contamination, p. G131-G137, May 25, 2004-Jan. 5, 2005.*
International Preliminary Report on Patenttability of PCT/US2006/005499.
International Search Report of PCT/US2006/05499.

* cited by examiner

*Primary Examiner* — Tung S Lau (57) ABSTRACT

A method for detecting particulate contamination under a workpiece fixtured by a calibrated material handling system includes performing 3D measurements of a workpiece at multiple of positions to construct a 3D map of the workpiece, calibrating the 3D map by comparing a pre-computed calibration map to the 3D measurements, and detecting particulate contamination by processing the calibrated map.

5 Claims, 9 Drawing Sheets

METHOD FOR DETECTING PARTICULATE CONTAMINATION UNDER A WORKPIECE

RELATED APPLICATION

This is a divisional application of U.S. patent application Ser. No. 11/059,025, filed Feb. 15, 2005, now issued U.S. Pat. No. 7,363,180.

BACKGROUND OF THE INVENTION

1. Field of the Invention

This invention relates to calibration of material handling systems and more particularly to methods for calibrating material handling systems that fix in place workpieces such as semiconductor wafers for laser processing operations. This invention provides methods for identifying and correcting systematic errors that can be pre-computed and applied to each subsequent workpiece processed by the system.

2. Description of Related Art

Laser micro-machining is employed in a variety of operations related to semiconductor and electronics manufacturing. Some of the applications of laser processing include repair, configuration, and marking semiconductor die such as dynamic random access memory (DRAM); laser trimming of passive components; drilling vias in substrates; and impedance tuning of integrated semiconductor devices. In the example of DRAM repair, a semiconductor wafer containing DRAM integrated circuits (ICs) is tested and a list is prepared of those memory cells that fail to perform to specification. A memory yield improvement system then takes this list and directs a laser to logically remove the failed cells by focusing laser pulses onto fusible links to process them. The system then directs the laser to process fusible links associated with redundant memory cells and thereby add them to the circuit to replace the failed cells removed in the previous step. Typically laser processing of fusible links entails severing the link; however, in some cases laser processing will make an electrical connection between circuit elements. In passive component trimming, the system directs a laser onto a passive component, such as a thin film resistor, of an electronic circuit to modify its electrical properties while the circuit is being monitored by the system. In this example, the laser is directed to remove material from the resistor until the appropriate resistance value is reached. In via drilling, the system directs a laser to form holes in a substrate by either thermal effects or ablation, depending upon the laser energy, to allow electrical connections to be made between circuit layers separated vertically by insulating material. In impedance tuning, the system directs a laser at a semiconductor junction to heat it and cause re-distribution of dopants within the semiconductor junction to alter its electrical characteristics.

What these applications all have in common is that it is desirable to accurately direct a laser pulse of a specific size at an IC or a substrate. It may also be desirable to deliver at specific locations laser pulses with specific properties that include temporal pulse shapes, timing, pulse energies, and spatial energy distributions. There is considerable prior art related to these topics. For instance, U.S. Pat. Nos. 4,941,082 and 6,172,325, both assigned to the assignee of this patent application, describes methods and apparatus for accurately and rapidly delivering laser pulses to a workpiece. One thing these systems have in common is that all of them perform an alignment and calibration step prior to processing a workpiece. This step includes locating reference marks on the workpiece and using this information to position the workpiece with respect to the laser system to enable accurate processing.

It is well known that semiconductor and electronic devices are becoming denser and denser, with ever increasing amounts of circuitry being packed into smaller and smaller dimensions. As the dimensions of semiconductor and electronic components become smaller, it may be desirable to achieve higher accuracy in positioning the laser beam with respect to the workpiece. The above-mentioned U.S. Pat. Nos. 4,941,082 and 6,172,325 describe methods and apparatus for delivering a laser pulse accurately and at high speed in the X and Y coordinates, which are the coordinates generally perpendicular to the laser beam and parallel to the workpiece.

Figure 1:
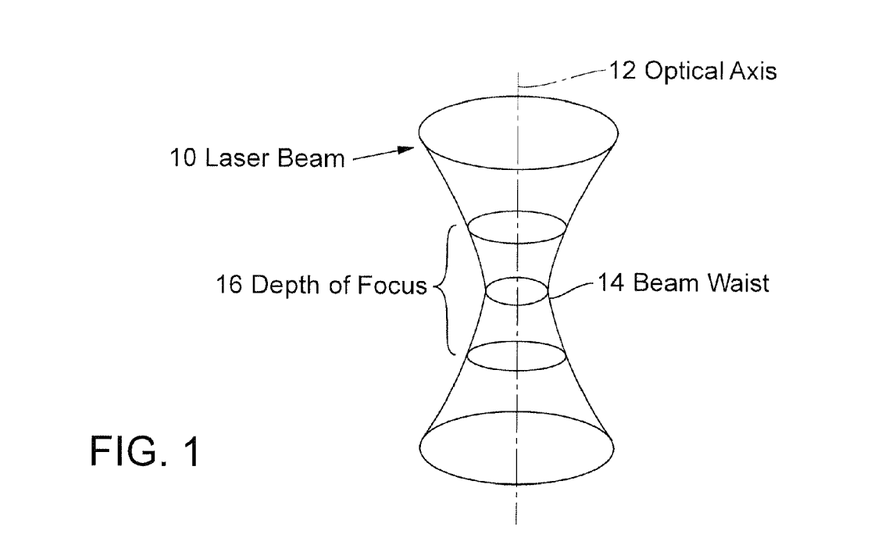
FIG. 1 is a drawing of a laser beam showing the beam waist, spot size, and depth of field.

It is also well known, however, that focused laser beams have three-dimensional (3D) shapes that affect the focal spot characteristics in the Z axis, which is the axis generally parallel to the laser beam, in addition to the X and Y axes. The laser beam can be focused down to a desired spot size at a particular distance from the focus optics, but as one moves along the beam in the Z axis either closer to or farther away from the nominal focal distance, the spot size typically increases. A diagram of a typical laser beam is shown schematically in FIG. 1. The laser beam 10 is centered about an optical axis 12. The beam waist 14 is the point along optical axis 12 where beam 10 achieves its minimum spot size. The range within which laser beam 10 can maintain a spot size equal to or less than a specified diameter is referred to as depth of focus (DOF) 16. As is well known to one skilled in the art, as the minimum laser beam spot size is reduced typically by using lenses with higher numerical aperture (NA), the DOF is also reduced. It is common for there to be variations in workpiece location and surface height in all of the areas of art discussed in this patent application due to reasonable manufacturing tolerances in both the workpiece and the material handling system holding it. When the natural variations in the workpiece surface are on the same order as the DOF and desired laser beam accuracy, methods can be employed to compensate for these variations. One way to maintain a desired laser beam accuracy and spot size over the entire workpiece is to perform X, Y, and Z axis correction on the laser beam as it traverses the workpiece.

A current technique for accomplishing X, Y, and Z axis correction is represented by U.S. Pat. No. 6,483,071, in which four non-collinear points on a workpiece surface are measured and a bilinear surface is interpolated between them. The axes of a three-axis motion control system are then instructed to follow the interpolated contour in an attempt to maintain the actual workpiece surface within the DOF of the laser beam. A major shortcoming of prior art solutions is that they ignore the large amount of a priori information regarding workpiece Z-axis variations that is available for analysis. A first source is information regarding systematic variations in X, Y, and Z locations caused by the material handling system. A second source is information regarding characteristics of Z axis variations caused by particulate contamination trapped between the workpiece and the material handling system.

A desirable improvement to the state of the art would be to develop a method for performing X, Y, and Z axis correction that takes into account a priori information regarding the material handling system and the specific nature of errors caused by particulate contamination. These improvements would provide more accurate X, Y, and Z axis correction and thereby enable the use of higher NA lenses that produce a smaller laser beam spot size with shorter focal depths than those used by previous methods. The prior art also computes all of the corrections at run-time, as the workpiece is being processed. Speeding up processing, another desirable improvement, could be achieved if at least a portion of the X, Y, and Z axis correction could be pre-computed prior to processing a particular workpiece.

BRIEF SUMMARY OF THE INVENTION

An object of this invention is, therefore, to provide a method for improving the accuracy of X, Y, and Z axis correction applied to a workpiece fixed in a material handling system for the purpose of performing laser-based operations on or in the surface of the workpiece by accurately mapping systematic errors introduced by the material handling system.

An advantage of the method for improving the accuracy of X, Y, and Z axis correction applied to a workpiece fixtured in a material handling system is that the method detects and compensates for distortions to the surface of the workpiece caused by particulate contamination trapped between the workpiece and the material handling system.

It is recognized that the full description of the relationship between the laser beam and the workpiece in three dimensions involves six variables, three translational coordinates X, Y, and Z and three rotations, $\rho$, $\phi$, and $\theta$, one in each plane defined by pairs of the translational coordinates. Performing corrections based on six degrees of freedom would require use of perspective transformations in three dimensions. While these calculations are mathematically possible, they are more difficult and time consuming than the calculations taught herein. Experiments have shown that piecewise calculation of the X, Y, and Z approximations to the full six degrees of freedom as taught herein provides accuracy much greater than that achievable in the prior art. If accuracy greater than that obtained with piecewise calculations of the X, Y, and Z translational approximations is desired, then a full six degrees of freedom calculation of the perspective transformation could be used to achieve greater accuracy.

A preferred embodiment of the method entails first fixing a carefully cleaned and inspected wafer, production wafer (collectively, "wafer"), or calibration grid, any of which constitutes a workpiece, in or on a cleaned material handling chuck of the laser micro-machining system. This can be either a sample of the types of wafers to be processed or a wafer or grid specially fabricated for this purpose. The wafer or grid deforms to the surface of the chuck, typically aided by the use of vacuum pressure between the wafer or grid and the chuck. The wafer or grid is scanned by the system to form a high-resolution 3D map of the surface. If the wafer or grid flatness is known to be comparable to the resolution of the map, then the measurement of the wafer surface will adequately match the measurement of the chuck surface. If it is desired to have a more accurate map of the chuck surface, the wafer could be measured independently on a system with higher resolution and then the wafer thickness at any given point could be subtracted from the scanned surface height data to increase the precision of the chuck surface map. Equivalently, the surface of the chuck could be scanned to directly form a 3D map of the surface. The resulting surface is analyzed using the methods described herein, and a correction map is generated.

Each subsequent wafer fixed in the chuck for processing by the system is first scanned to form a 3D map of the particular wafer. This 3D map is processed using the correction map to correct for systematic errors in the location of the wafer and to detect and locate particulate contamination, if it is present. The data produced from this processing may be used to reject the wafer and produce a signal that could result in a cleaning operation and re-insertion of the wafer. Alternatively, if the wafer is not rejected, the information regarding contamination is combined with the correction map to guide the system in performing Z axis correction to the laser beam during processing of the wafer. The entire wafer may be scanned and a 3D map generated prior to processing; or the wafer may be scanned in regions, with each region being successively processed using corresponding regions of the precomputed 3D correction map.

The advantages of this method of estimating Z axis error are that it is more accurate than previous methods, and since substantial portions of the error can be pre-computed and stored, it is faster than previous methods. These are desirable features of a laser memory yield improvement system. Since accuracy and speed are also desirable attributes of virtually all laser micro-machining applications, one skilled in the art can envision that these methods would be of benefit for any laser-based micro-machining system.

DETAILED DESCRIPTION OF THE INVENTION

In a preferred embodiment, a silicon wafer is fixed in place in a chuck and positioned with respect to a laser beam that will be pulsed for incidence on micromachine fusible links on the surface of the wafer. In this case, several factors can cause variations in the X, Y, and Z accuracy of a laser micromachining system. Accuracy is a function of the relationship between the laser beam and the workpiece. The relationship between the laser beam and the workpiece is a function of several moving parts, optics, and the workpiece, each with its own sources of error. For instance, in a preferred embodiment, the wafer chuck may be attached to an X, Y table that moves the wafer under the laser beam to position it at a desired location on the wafer. Alignment of the X and Y axes to each other and alignment of the plane formed by the X and Y axes, in addition to possible errors in travel along each axis, all contribute to errors attributable to the chuck motion control, among other possible sources of error. The laser beam and its beam shaping and positioning system can also contribute to possible errors in accuracy. Any errors positioning the beam or non-linearity in the optics will cause the system to position the beam erroneously.

In a preferred embodiment, the material that is fixed in place is a silicon wafer containing multiple IC die fabricated on the surface of the silicon through various process steps. While normally thought of as a rigid disk, the wafer actually exhibits a degree of flexibility that allows it to generally conform to the shape of the chuck and to deform in response to particulate contamination trapped between the a backside of the wafer and the chuck as the wafer is pulled down to the surface of the chuck by vacuum pressure applied through holes or openings in the chuck. The degree of flexibility exhibited by the wafer is dependent upon the material rigidity, thickness, and diameter of the wafer, as well as the force of the applied vacuum pressure, among other variables. A description of the mathematical principles underlying plate bending can be found in, for example, Roark's Formulas for Stress and Strain by Young and Budynas, 7 th Ed. 2002. The wafer used to develop the 3D correction map could be a sample of the actual wafers to be processed by the system or a calibration grid, specially produced from a wafer or wafer-like materials to include additional targets that could improve the accuracy and density of the points on the surface of the wafer sampled to construct the 3D map.

Errors in beam-workpiece positioning can be divided into three parts. The first part includes repeatable errors attributable to the chuck, motion control mechanism, beam positioning, and beam shaping optics, among other sources. For a given system, these sources of error are constant and can be measured and compensated for. The second source of error is random error inherent in any physical measurement system caused by quantization and dynamic positioning errors, among other sources. This source of error is unavoidable but can be minimized by careful system design and measurement techniques, such as averaging, to be of far less magnitude than that of the first source of error. The third type of error is particulate contamination between a backside of the workpiece and the chuck. This source of error is less persistent than the first, because it can change with each workpiece processed by the machine, but far more persistent than the second source because the third source of error will remain unchanged during the processing of a given workpiece.

There are several methods of measuring the persistent errors generated by a laser micromachining system. The first uses a direct feedback capability on the positioning equipment to provide an indication of the position of the workpiece. Examples of this type of measurement include linear encoders, laser triangulation sensors, and interferometers. More accuracy in measuring the X and Y error can be obtained, however, by producing a special workpiece with fiducial locations to be measured accurately placed on or embedded in the surface. In this case, the fiducials are designed to be measured with the laser beam itself or with a machine vision system. The workpiece can be positioned with respect to the laser beam to find and measure the location of the fiducial. Some of the methods of measuring the location of a fiducial include (1) moving the laser beam relative to the workpiece and measuring the reflected energy to detect the location of the fiducial and (2) measuring the location of the fiducial using a video camera and machine vision techniques to accurately locate the fiducial. Those skilled in the art will recognize that these are two of many methods of measuring a fiducial target on a workpiece. The actual measured location can be compared to the predicted position and the difference calculated. The calculated differences are proportional to the persistent errors generated by the system. The measurements can be repeated to reduce the random measurement error, and the workpiece and chuck can be carefully cleaned prior to measurement to eliminate the particulate error.

Figure 5:
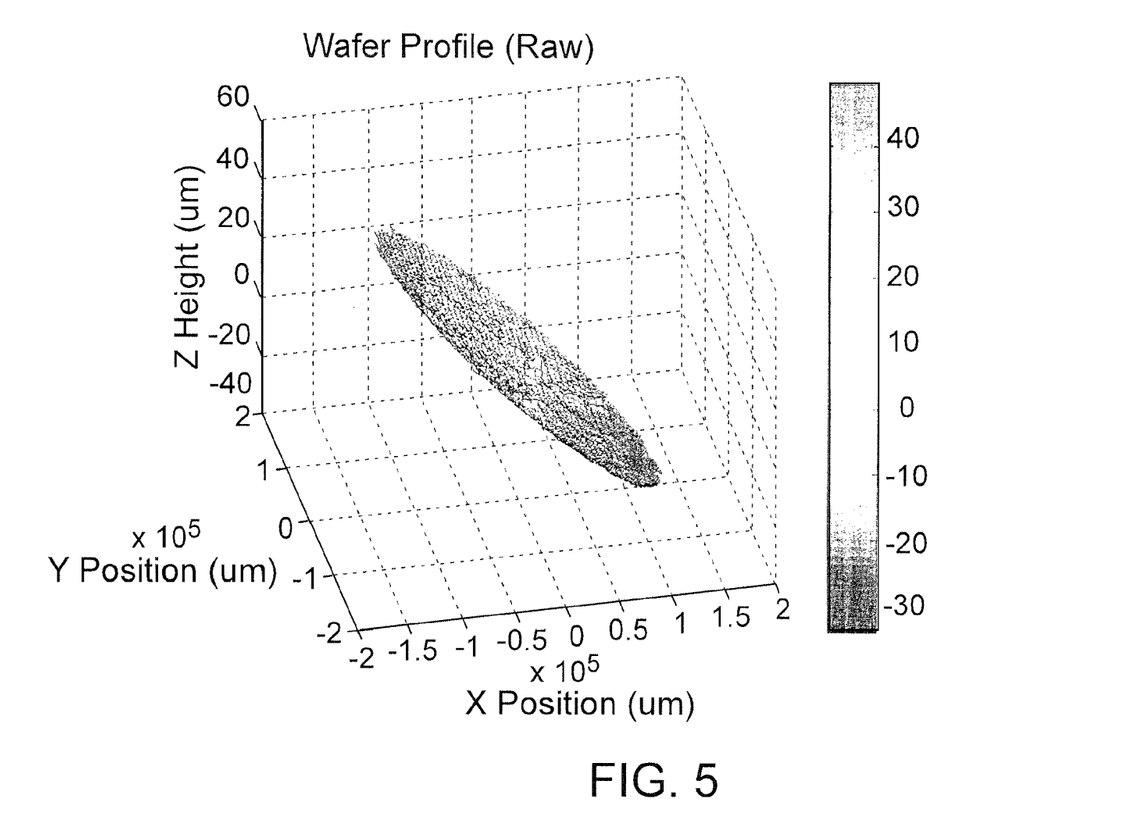
FIG. 5 is a drawing showing a raw 3D scan of a wafer fixtured in a material handling chuck.

Measuring the Z axis height of the wafer can be performed in any one of a number of methods. One such method entails acquiring images of the laser spot illuminating a reflective target on the surface of the wafer. The system is stepped through several steps in Z height, and the beam is scanned across the edge of the target at each step. The sharpness of the change in reflection during the scan across the edge of the target is measured at each step, and the sharpness values associated with the Z height step are plotted. The point of maximum sharpness and hence the true Z height of the surface is the Z height corresponding to the potentially interpolated peak of the sharpness curve. In similar fashion, any portion of the wafer containing sufficient surface detail can be imaged under laser illumination to yield a contrast value. If the system Z height is stepped through several values and the contrast values plotted as above, the Z height can be deduced from the point of maximum contrast. Z height can also be measured directly by any one of a number of methods, including laser triangulation or interferometry. Those skilled in the art will recognize that these methods, in addition to other methods not mentioned here, can be used to generate 3D data from a wafer. FIG. 5 shows a 3D map of a wafer scanned using one of these methods.

Figure 2:
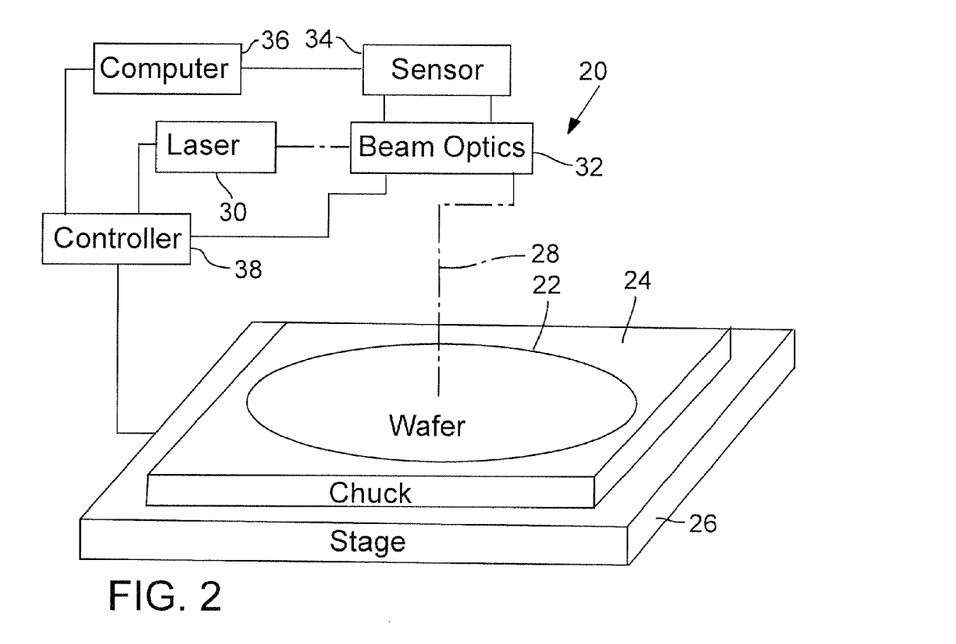
FIG. 2 is a schematic drawing of a laser-based memory yield improvement system used to implement the methods described herein.

FIG. 2 shows an exemplary system 20 for carrying out a preferred embodiment of the method of the invention. A semiconductor wafer 22 is carefully cleaned to remove particulate contamination and fixtured in an equally clean chuck 24. Chuck 24 is mounted on a motion control stage 26 that is capable of moving the chuck in the X, Y, and optionally Z axes. A laser beam 28, produced by a laser 30, is directed onto the surface of wafer 22 by beam optics 32. Beam optics 32 focuses beam 28 down to the desired spot size and directs energy from the spot reflected by the workpiece to a sensor system 34. This sensor may be a video camera connected to a computer 36 or other type of sensor that acquires a return signal from laser beam 28. Beam optics 32 optionally provides the capability to steer the beam in X, Y, and Z under command of a controller 38. Movement of the laser beam and hence the focal spot in the Z axis can be provided by motion control stage 26, beam optics 32 or both under control of controller 38. Controller 38 and computer 36 may be one unit or separate units. Controller 38 and computer 36 directs laser beam 28 to a particular point on wafer 22, where computer 36 directs sensor system 34 to acquire data from the wafer 22 illuminated by laser beam 28. The data acquired from wafer 22 is processed by computer 36 to calculate the X, Y, or Z location of a given point on wafer 22. A single measurement can result in the X location of a point on the wafer, the Y location or a point on the wafer, or the Z location of a point on the wafer. In come cases, the method of measurement may provide information about more than one axis in a single measurement. For instance, machine vision techniques can measure the X, Y, and Z locations to high accuracy in a single measurement. Another method of measuring the Z-height of wafer 22 is to have system 20 direct controller 38 to move beam optics 32 or motion control stage 26 or both to step the surface of wafer 22 through laser beam 28 along the Z axis, acquiring data at each step, and processing these data to determine the Z height of wafer 22 at that point. System 20 then repeats this procedure at additional points on wafer 22 sufficient to form a 3D map of the wafer surface. The actual methods of acquiring 3D data from wafer 22 have been the subject of prior art and will be assumed to be familiar to anyone skilled in the art.

The actual number and locations of the points sampled is determined by a tradeoff among parameters including speed, resolution, and the features used to determine height. This process can be performed prior to actual processing of material for production; therefore, the amount of time allotted to this process can be greater than if it is performed during production. In the case where reflective targets are used to determine the 3D map, the sample pattern is determined by the pattern of targets lithographically placed on the wafer. In the case where the 3D map is acquired by means of depth of focus, the wafer can be sampled anywhere there is sufficient surface detail to allow contrast to be measured. Sample density required could also be derived from plate bending theory. Plate bending theory is applied to detect variations in the wafer surface that cannot be modeled with a biquadratic surface. To apply plate bending theory, one first selects the smallest deviation to be detected, referred to as the peak deflection or $Z_{max}$ calculated according to the formula $$Z_{max} = \frac{Wa^2}{16\pi D} \quad (1)$$

where $W=P\pi a^2$, P being the vacuum pressure, typically in the range of 55000 Pa, a is the radius of the deflected area, and D is the plate constant, calculated according to the formula $$D = \frac{Et^3}{12(1-v^2)} \quad (2)$$

where t is the wafer thickness, E is the modulus of elasticity, and v is Poisson's ratio. For silicon wafers t≈775 microns, E≈160 Gpa, and v≈0.25. The radius of deflection, a, is then calculated by the formula $$a = \left(\frac{16DZ_{max}}{P}\right)^{\frac{1}{4}} \quad (3)$$

where D, $Z_{max}$, and P are as defined above.

Figure 3:
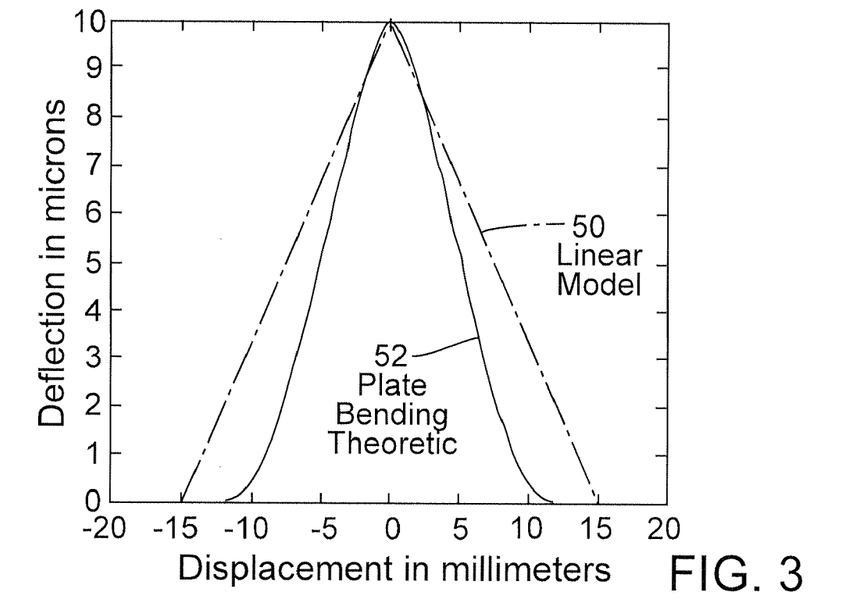
FIG. 3 is a graph illustrating the surface deformation of a wafer according to plate bending theory.

As an alternative, the deflection of a wafer by the combined action of a particle and the vacuum pressure could be calculated by other closed-form solutions of the equations of elasticity or by using finite element or equivalent methods. FIG. 3 shows the difference between using a standard linear model of deflection 50 caused by particulate contamination and using a model based on plate bending theory 52.

Figure 4:
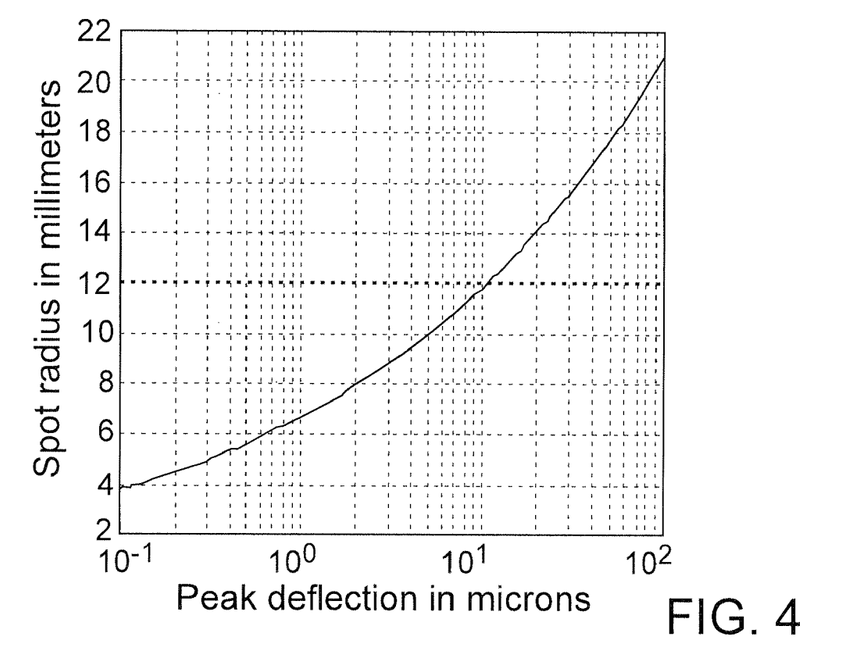
FIG. 4 is a graph showing the relationship between the radius of deformation vs. peak deflection (particle size).

FIG. 4 shows a graph of the radius of deflection "a", plotted vs. $Z_{max}$ or the "peak deflection," calculated for a typical wafer. Once the minimum detectable peak deflection is selected for a given wafer, the radius of deflection or spot size indicates how densely the wafer must be sampled, given the expected error in the 3D measurement, to detect the selected deviation in the surface. Once the wafer is scanned and the X, Y, and Z data are gathered, the data are analyzed. A first object of this analysis is to determine the errors in X and Y location. It is assumed that a workpiece is produced that has measurable points at known locations on the surface to be measured. The measured points are compared to their nominal locations by fitting the measured data to the known data. This fit can be performed using a least-squares fit to minimize the total error or b-splines as described below. The purpose of this fit is to determine the deviation of the measured travel in the system from the ideal. The method of performing this analysis in the preferred embodiment is to first measure the cross-track error. This entails calculating the error in one axis as a function of a second axis. For instance, the error in Y is calculated as a function of X. Then the error in X is calculated as a function of Y. Once the cross-track error is estimated, it is corrected for and the along-track error is calculated. This entails calculating the error in Y, for instance, as a function of Y and the error in X as a function of X. These errors are combined with the cross-track errors to form the first part of the correction map.

Figure 6:
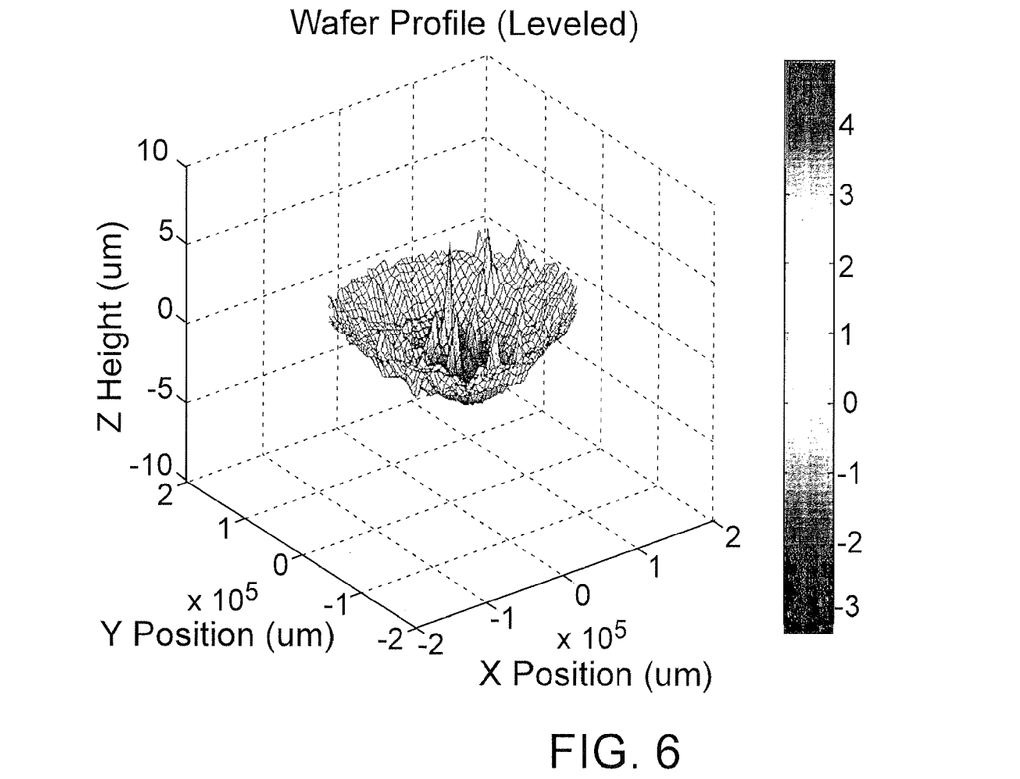
FIG. 6 is a drawing showing the 3D data after removing the tilt introduced by the material handling system.
Figure 7:
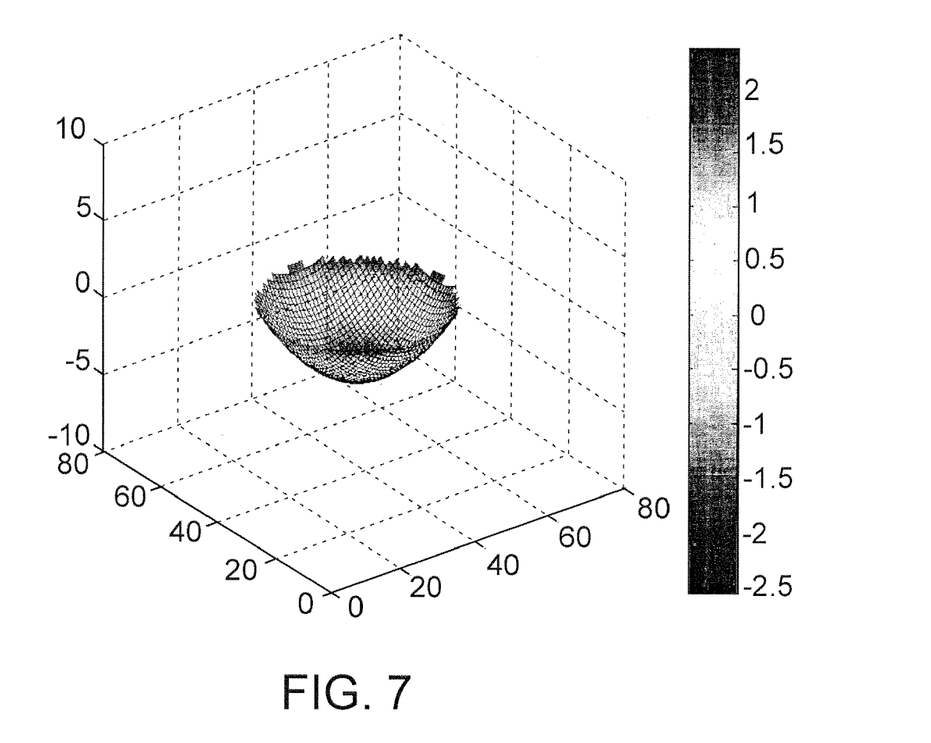
FIG. 7 is a drawing showing the systematic bowl shape calculated to fit the data depicted in FIG. 6.
Figure 8:
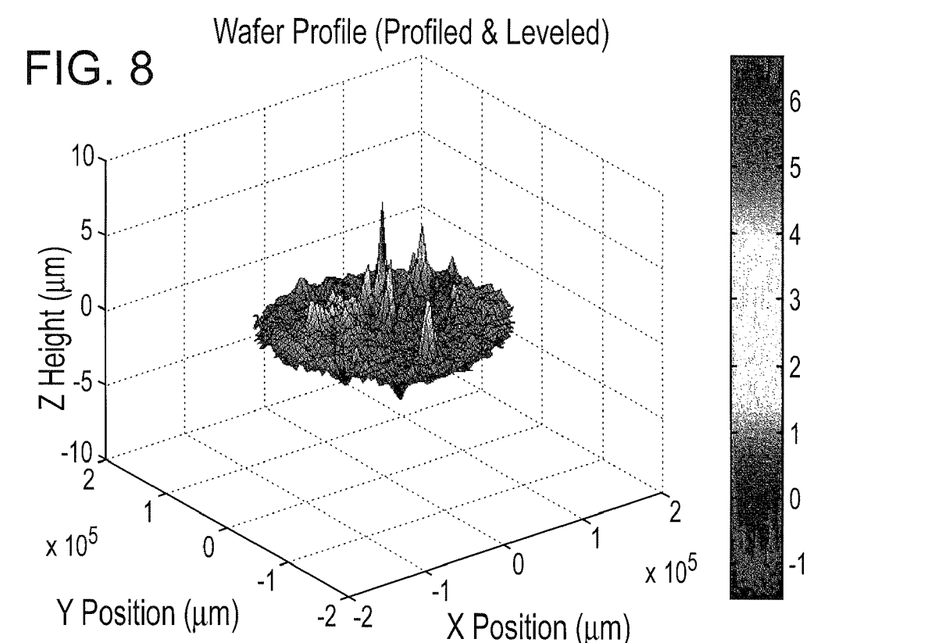
FIG. 8 is a drawing of the 3D data after the systematic bowl shape has been subtracted out, showing detected particulate contamination.

Once the X and Y axes of the system are calibrated, the Z axis is calibrated. The object of the analysis is to determine the variation in Z axis height due to the material handling system. If the material handling system could be constructed so that the X, Y motion control axes were perfectly perpendicular to the laser beam axis and the wafer chuck could be machined to be perfectly flat, the laser beam focal spot could be adjusted once and the entire wafer processed. However, typically, there exists some error in both the X and Y motion control axes and the flatness of the chuck. The process begins using the acquired 3D map of the surface as shown in FIG. 5. The first step of the analysis is to fit a plane to the 3D data in the least squares sense. This plane corresponds to the tilt introduced by the X, Y motion control system. Subtracting the fit plane from the original data leaves a residual error and is illustrated in FIG. 6. The second step is to fit a biquadratic surface to the residual error from the previous step. A biquadratic surface is chosen because it most closely matches the observed errors introduced by the chuck. The final stage in manufacturing wafer chucks typically entails lapping or grinding the surface to a specified flatness. When this finishing operation is performed to tolerances typically employed in the semiconductor and electronics manufacturing industry, a slight dish shape may be left in the chuck by this process, on the order of a few microns maximum depth. While this dishing of the chuck is well within tolerance for machining operations, it becomes evident at the scale at which laser micromachining takes place. In addition, chuck deformation can be caused by stresses introduced into the chuck by attaching the chuck to the system or by thermal effects in the chuck that change its position relative to its mounting. FIG. 7 shows the calculated biquadratic surface. FIG. 8 shows the results of fitting a biquadratic surface to the residual data from step one and subtracting this surface from the residual. The sharp peaks in FIG. 8 show particulate contamination detected by this method. The Z-axis scale has been expanded to show the particulate contamination more clearly. The first and second steps may be combined into a single step that models both the tilt and dishing errors and calculates the residual by subtracting a single fit surface from the original data.

Figure 9:
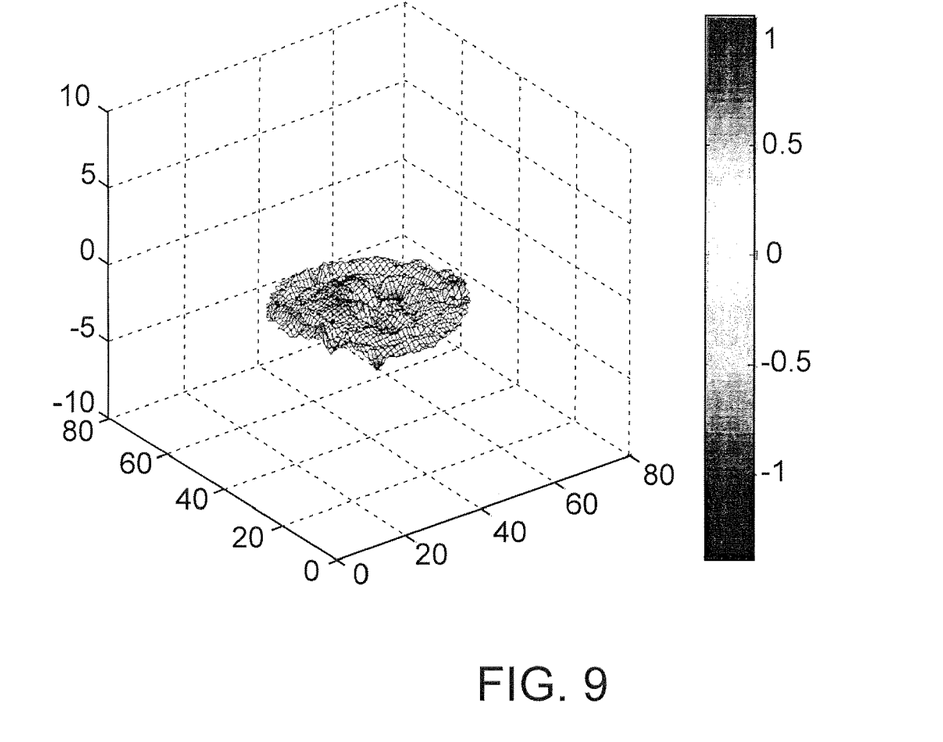
FIG. 9 is a drawing of the residual error of a clean chuck after systematic errors have been removed by the methods taught herein.

A third step of the analysis entails dividing the residual data formed from the subtraction of the biquadratic surface into a number of adjacent regions and fitting surfaces in the least squares sense to each region separately. The surface fit can be planar, bilinear, biquadratic, bicubic, higher order polynominal, or a model based on plate bending theory, depending upon empirical data regarding the type of residual error that survives the first two process steps. One skilled in the art will recognize that other types of basis functions, including a trigonometric series such as a sine/cosine series or Zernike polynominals, alternatively could be used to fit the surface. To suppress random errors that may be a function of the particular wafer being scanned or due to measurement error, the residual data are filtered prior to curve fitting. This filter may be in the form of a linear smoothing filter or a non-linear order statistic-based filter. The curve fitting in this step could also be in the form of splines, in which each region is fit to a polynomial function separately, but are constrained to smoothly join the adjacent region. This method has the advantage of mirroring the underlying physical structure of the wafer, where abrupt discontinuities are not found. It also has the advantage of allowing z-motion across the boundaries of regions to be continuous and smooth, so that infinite velocity, acceleration, or jerk is not required from the positioning system. FIG. 9 shows the results of performing this analysis on the data from FIG. 8 after filtering the data specifically to remove particulate contamination. The data in FIG. 9 represent the variation in the 3D surface of the wafer due to irregularities in the surface of the chuck not removed by the previous steps. These irregularities, along with the parameters determined in the previous steps, will be used to calibrate the system to define the exact location in X, Y, and Z of any desired point on the surface of the workpiece to enable the system to direct any particular portion of the laser beam at a chosen location on the wafer with the required accuracy.

We note that the selection of particular polynomial functions such as linear, biquadratic, or bicubic are based on the example shown for the preferred embodiment. One skilled in the art would appreciate that any one of a number of different basis functions could be used to yield similar results, including higher order polynomial functions, trigonometric functions such as sine/cosine series, or Zernike polynomials, for instance.

One additional technique to enhance the accuracy of measured persistent system errors entails an iteratively evolving map. Errors determined from measured and predicted locations of fiducial targets on numerous wafers can be incorporated into the map of persistent errors using an appropriate algorithm for averaging, recursively evolving, or adapting the persistent error map. These errors may be determined from wafers or calibration grids introduced into the system for calibration purposes, or may also be measured while processing workpieces. The model changes may occur over a time scale appropriate for a particular application by the selection of parameters of the adaptive scheme. One advantage of an evolving map of errors is that any residual errors from thickness, variations or particulate contamination of one wafer will average out. Another advantage is that particles brought into the system by a workpiece may adhere to the surface of the chuck. In this situation, particulate errors become persistent errors of the system, and can be accounted by the evolving error map.

B-splines can act as filters to smooth the data. When using polynomial or sine/cosine series fits to the error, a small error in the measurement of one point can cause errors in the fit across the entire field unless the small error is filtered out. Furthermore, depending on the number of measured points and the order of the polynomial or series, an error in measuring a point could cause the fit curve/field to have an error of even greater magnitude, possibly at a location distant from the point with measurement error. On the other hand, a small deformation due to a particle might be disregarded once filtering is applied to the data before a polynomial or sine/cosine series fit. A B-spline fit solves these problems because errors remain local in that they do not affect the fit at distances far from the measured point. B-splines are also variation-diminishing in that fit curve/surface error is guaranteed to be less than or equal to the error at the measured point. The result is that the fit of local variations is bounded, unlike with polynomial or sine/cosine series fits.

B-spline curves use a set of blending functions to interpolate between a set of points. They are described in such books as *An Introduction to NURBS: With Historical Perspective* by David F. Rogers, 2001. To facilitate an understanding of B-spline interpolation, let p(t) be the position along a B-spline curve as a function of parameter t. Then the B-spline curve is defined by the equation $$p(t) = \sum_{i=1}^{n+1} B_i N_{i,k}(t) \quad (4)$$

where $2 \leq k \leq n+1$, the $B_i$ are the positions of the n+1 vertices of a polygon that controls the spline's shape, and the $N_{i,k}$ are B-spline lending functions defined by $$N_{i,1}(t) = \begin{cases} 1 & x_i \leq t < x_{i+1} \\ 0 & \text{otherwise} \end{cases} \quad (5)$$

$$N_{i,k}(t) = \frac{(t - x_i)N_{i,k-1}(t)}{x_{i+k-1} - x_i} + \frac{(x_{i+k} - t)N_{i+1,k-1}(t)}{x_{i+k} - x_{i+1}}$$

The parameter k controls the degree of the polynomial function p(t). The curve p(t) and its derivatives of order up to k-2 are all continuous. In order to find a B-spline curve which goes through a set of measured points, one must find the locations of the vertices $B_i$ of the polygon which defines the spline's shape. If there are j points to fit, denoted Dj(t), then the B-spline curve must satisfy $$D_1(t_1) = N_{1,k}(t_1)B_1 + N_{2,k}(t_1)B_2 + \cdots + N_{n+1,k}(t_1)B_{n+1} \quad (6)$$
$$\vdots$$
$$D_j(t_j) = N_{1,k}(t_j)B_1 + N_{2,k}(t_j)B_2 + \cdots + N_{n+1,k}(t_j)B_{n+1}$$

where $2 \leq k \leq n+1 = j$. This set of equations can be solved using linear algebra to find the vertices of the control polygon.

One skilled in the art will recognize that the three steps of surface fitting could be collapsed into one surface fit over the adjacent regions to achieve the same level of accuracy. The advantages of dividing the surface fitting into three steps are that first, the calculations are simplified and second, by correctly dividing the problem into surface fits that more closely model the sources of error, each source of error can be tracked separately. This enables the sources of error to be tracked more precisely and makes it easier to accurately evaluate changes in the system designed to reduce error. For example, using the methods taught herein, if a change is made in the X, Y motion control system, its effect might be reflected in the tilt parameter of the first surface fitting step, enabling the user to immediately determine whether the change increased or decreased the total error. For positioning systems other than those used in the preferred embodiment of this invention, alternative types of surfaces may be best suited to fit the data at one or more of the individual steps, or in a surface fit that combines two or more of the individual fits. The surface type to be used can be chosen to best model the errors in the positioning system.

This method has the additional advantage of being able to detect and identify particulate contamination trapped between the chuck and a backside of the workpiece. Variations in chuck height are many orders of magnitude larger than variations caused by particulate contamination. Therefore any system intended for use to detect particulate contamination compensates for chuck variation before attempting to detect particulate contamination. FIG. 8 illustrates an example of particulate contamination detected by this method, where the sharp peaks rising out of the disk (wafer) represent particulate contamination. A unique feature of this method is the ability to detect and identify particulate contamination, including predicting the size of the particle. This method works by assuming that the deformations in the surface of the workpiece, in this case a semiconductor wafer, obey the mathematical rules associated with plate bending theory. According to this theory, once the wafer thickness, its elastic properties, and the vacuum pressure holding it down are known, the only free variable is the size of the particle underneath. By measuring the height and radius of the deviation, the size of the particle can be predicted. In a preferred embodiment, the surface of the wafer would be sampled so as to ensure that particles of a pre-selected size would be detected by making the sample grid smaller than the predicted size of the deformation including sample error in Z. Once detected, the area surrounding the particle can be re-sampled at higher resolution, if necessary, to confirm the existence of the particle and achieve a better estimate of its size and location.

Figure 10:
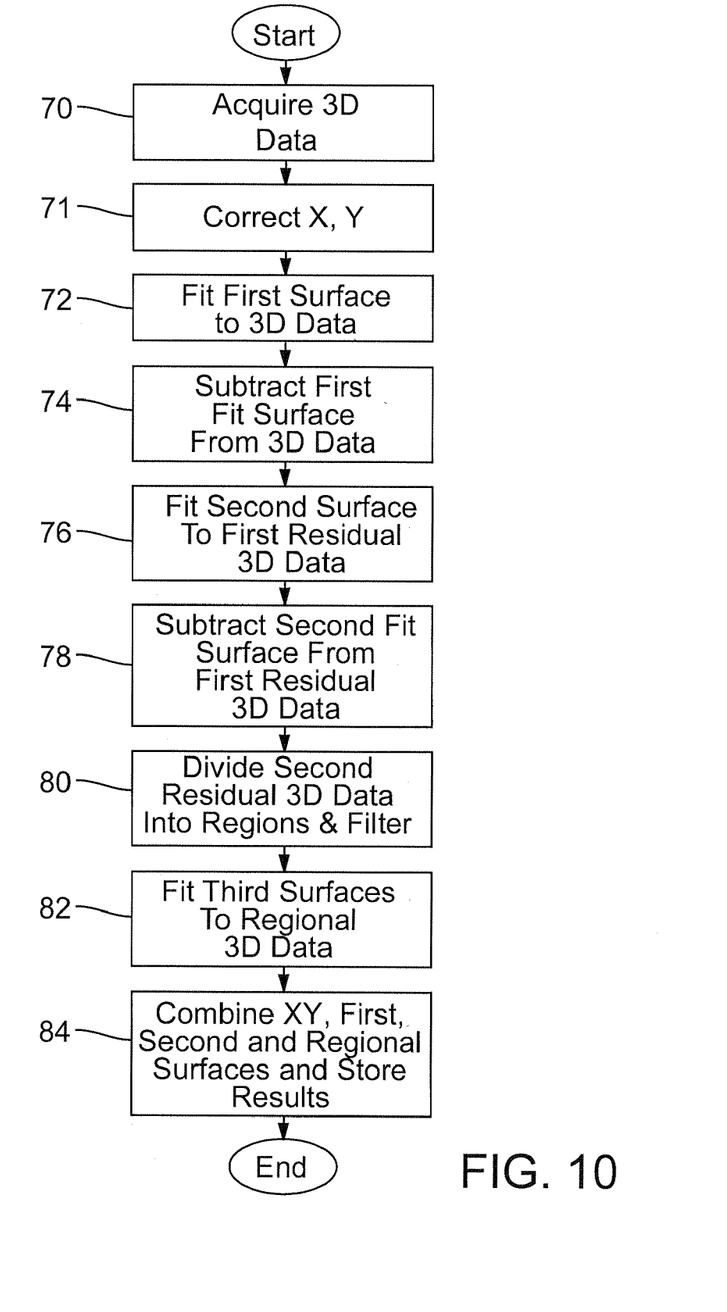
FIG. 10 is a flowchart illustrating the steps to be carried out in implementing the pre-processing methods taught herein.

A flowchart of the operations to be performed in the preferred embodiment to form the 3D error correction map is shown in FIG. 10. Prior to beginning the procedure, a carefully cleaned and inspected wafer 22 is fixtured in chuck 24 such that a backside of the wafer 22 faces toward the chuck 24. The next step 70 is scanning of wafer 22 by stage 26 and optionally beam optics 32 to collect the raw 3D data map. An example of a 3D map created by this method is shown in FIG. 5. The next step 71 is to use the 3D map to create the X, Y correction map as described previously. Following this, step 72 is fitting a bilinear surface $S_L(x,y)$ of the form $$S_L(x,y) = Ax + By + C \tag{7}$$

where A, B, and C are the coefficients to be determined by the least-squares fit. Step 74 entails subtracting the first fit surface $S_L(x,y)$ from the raw data to form the first residual map $R_1$, a drawing of which is shown in FIG. 6. Step 76 entails fitting a second, biquadratic surface $S_Q(x,y)$ of the form $$S_Q(x,y) = Dx^2 + Ey^2 + Fxy + G \tag{8}$$

where D, E, F, and G are the coefficients to be determined by the least-squares fit, to the first residual surface, and step 78 entails subtracting the second fit surface from the first residual 3D data of step 76 to form the second residual surface $R_2$. Those skilled in the art will recognize that other functions, including higher-order polynominals, could be used for this fit. A drawing of the biquadratic surface, $S_Q(x,y)$, created by this method is shown in FIG. 7. A drawing of the result of this subtraction is shown in FIG. 8. Step 80 entails filtering the residual surface $R_2$ and then dividing it into adjacent regions. These regions are selected principally to enable the filtering computation. The filter in the preferred embodiment is a low-pass filter designed to pass information that could come from systematic errors in the chuck and filter out information that could come from random noise. One method of implementing this filter is to transform the data into frequency space using a multi-dimensional Fast Fourier Transform (FFT), applying multiplicative filter to reduce or truncate the high frequencies, and then applying an inverse FFT to transform the data back into the spatial domain. In addition, removing systematic error in the first two steps enables the use of zeros to pad edges around the circumference of the wafer. By reducing the DC component of the data to close to zero before filtering, missing data can be replaced by zeros with minimal effect on the final answer. Alternative methods of implementing this filter include fitting the surface using b-splines as described above. Those familiar with the art will recognize that there are several methods of filtering a data sets to remove high frequency or random noise that all have similar results. Step 82 entails, following filtering, fitting the regions with a polynomial function, a sine or cosine series function, or splines. Step 84 entails combining the regional fit data with the surface fits produced in steps 72 and 76 and then combining these with the X, Y correction map produced in step 71 to produce the global error correction surface, which is then stored via computer 36 for use on subsequent wafers.

Figure 11:
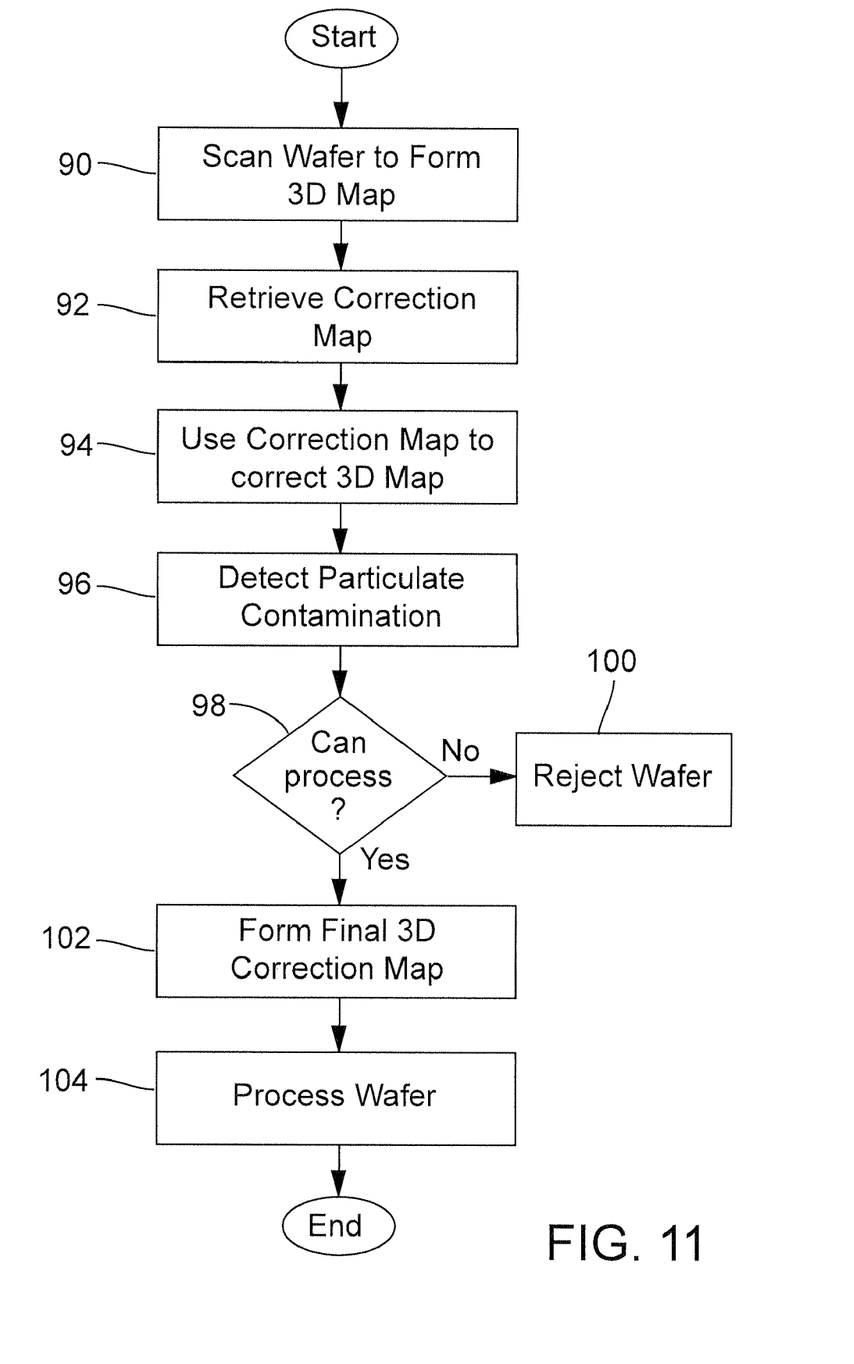
FIG. 11 is a flowchart illustrating the steps to be carried out in implementing the run-time methods taught herein.

Runtime processing of wafers follows the flowchart diagrammed in FIG. 11. Prior to beginning the process, the wafer 22 to be processed is fixtured in chuck 24 and in the first step 90 is scanned to produce a 3D map of the wafer 22. In step 92 the stored correction map is retrieved, and in step 94 the retrieved correction map is subtracted from the scanned 3D map. An example of the filtered correction map is shown in FIG. 9 and a processed particulate map is shown in FIG. 8. The residue from this subtraction is processed in step 96 to detect particulate contamination. Particulate contamination is initially detected by thresholding the residue from the previous step to identify deviations from the expected 3D error. Typically detection of particulate contamination would stop the process and an operator would be notified to remove the wafer, clean both the wafer and the chuck, and reinsert. Alternatively, the step of detecting particulate contamination may include re-scanning the wafer in the vicinity of the suspected particulate contamination to increase the density of 3D data points to assist in identifying the particulate contamination. Once the area containing the suspected particulate contamination is identified, a curve from the family of curves is described by the equation $$z = \frac{W}{16\pi D}\left[a^2 - r^2\left(1 + 2\left(\frac{a}{r}\right)\right)\right] \tag{9}$$

where z is the height deflection, a is the distance away from the center of the deflection of a disk of radius a, and W and D are as defined above. Alternatively, the curve could be fit with a different equation which better models the experimentally measured deflection of the wafer under the influence of particles and vacuum pressure. The result of this curve fitting is identification of the location and size of the suspected particulate contamination. Step 98 entails deciding, once all of the particulate contamination is identified in this manner, whether to continue processing or to reject the wafer as being unable to be processed. The criteria for rejecting or accepting a wafer for processing will depend upon whether the stage and beam optics can compensate for the 3D distortion introduced by the contamination and still be able to focus the beam waist on the surface of the wafer. Step 100 indicates a decision to reject the wafer. If the wafer is rejected, an operator may be notified to, for instance, clean and reinsert the wafer.

Step 102 indicates a decision to process the wafer. If the wafer is processed, the information regarding the deformation caused by the particulate contamination is combined with the pre-computed systematic error map to form a new error map that more closely models the surface of the wafer to be processed, including deformations caused by the particulate contamination. In step 104 the wafer is actually processed. In the preferred embodiment this would entail using the laser to sever links on the surface of the wafer. In other embodiments, the laser beam could be used to cut the wafer into individual circuits ("singulation") or anneal locations on the wafer surface. In yet other embodiments, the wafer could be replaced with a circuit board and the laser could be used to drill vias or trim components to value.

As will be understood by those skilled in the art, the present invention may be embodied in other specific forms without departing from the spirit or essential characteristics thereof. For example, the surface fit computations can be combined into one step, the number of adjacent regions can be increased or in fact decreased to one, the polynomial functions used to form the fit can be increased or decreased in degree, or other types of functions may be used. Also, the methods may be applied to types of laser processing other than memory repair. Accordingly, the disclosures and descriptions herein are intended to be illustrative, but not limiting, of the scope of the invention which is set forth in the following claims.

The invention claimed is:

1. A method for, detecting particulate contamination under a backside of a workpiece fixtured by a material handling system, comprising:
   fixturing a workpiece to a chuck of the material handling system such that the backside of the workpiece faces toward the chuck;
   performing 3D measurements of the fixtured workpiece at multiple positions to construct a 3D map of the workpiece;
   calibrating the 3D map by comparing a pre-computed calibration map to the 3D measurements;
   detecting particulate contamination between the workpiece and the chuck by processing the calibrated 3D map; and
   storing said detected particulate contamination for use in calibrating subsequent workpieces, thereby to permit correction of errors.

2. The method of claim 1, wherein the processing is one of thresholding or plate bending theoretic.

3. The method of claim 1, wherein the processing includes estimating the size of the particulate contamination.

4. The method of claim 1, wherein the performing 3D measurements results in a first set of measurements, and the detecting particulate contamination further comprises performing 3D measurements of the workpiece in a vicinity of the detected particulate contamination to increase sample density near the detected particulate contamination.

5. The method of claim 1, further comprising, in response to said stored, detected particulate contamination, deciding whether to cease processing of the workpiece, continue processing of the workpiece, process a fractional portion of the workpiece, or clean, the workpiece to remove contamination from it.

* * * * *